United States Patent
Winsor et al.

(10) Patent No.: US 11,042,862 B2
(45) Date of Patent: Jun. 22, 2021

(54) METHODS AND UTILITIES FOR CONSUMER INTERACTION WITH A SELF SERVICE SYSTEM

(71) Applicant: ViaTouch Media, Inc., New York, NY (US)

(72) Inventors: James Winsor, Riverside, CA (US); Robert Hurtado, Corona, CA (US); Milan Alvarado, Riverside, CA (US); Thomas Murn, San Diego, CA (US)

(73) Assignee: ViaTouch Media, Inc., New York, NY (US)

( * ) Notice: Subject to any disclaimer, the term of this patent is extended or adjusted under 35 U.S.C. 154(b) by 0 days.

(21) Appl. No.: 16/066,559

(22) PCT Filed: Dec. 13, 2017

(86) PCT No.: PCT/US2017/066190
§ 371 (c)(1),
(2) Date: Jun. 27, 2018

(87) PCT Pub. No.: WO2018/112089
PCT Pub. Date: Jun. 21, 2018

(65) Prior Publication Data
US 2020/0273011 A1 Aug. 27, 2020

Related U.S. Application Data (60) Provisional application No. 62/454,551, filed on Feb. 3, 2017, provisional application No. 62/454,687, filed
(Continued)

(51) Int. Cl.
*G06Q 20/20* (2012.01)
*G06N 5/04* (2006.01)
(Continued)

(52) U.S. Cl.
CPC ............ *G06Q 20/203* (2013.01); *G06N 5/04* (2013.01); *G06Q 10/087* (2013.01); *G06Q 20/18* (2013.01);
(Continued)

(58) Field of Classification Search
CPC ...... G06Q 10/087; G06Q 30/02; G06Q 10/08; G06Q 10/0875; G06Q 20/18; G07F 11/16;
(Continued)

(56) References Cited

U.S. PATENT DOCUMENTS 5,997,928 A * 12/1999 Kaish .................. G07F 9/105
221/135
8,140,185 B2 * 3/2012 Simmons ............... G07F 9/002
700/241

(Continued)

OTHER PUBLICATIONS

Extended European Search Report issued in European Application No. 17881917.3 dated Oct. 19, 2019, 7 pages.
(Continued)

*Primary Examiner* — Peter Ludwig
(74) *Attorney, Agent, or Firm* — Weber Rosselli & Cannon LLP (57) ABSTRACT

A method of interacting with an automatic retail device, including receiving user identification information at the automatic retail device and receiving confirmation of the identity of the user from a source external to the automatic retail device. The method further includes determining the contents of the automatic retail device at a first time, determining the contents of the automatic retail device at a second time, transmitting data regarding the determined contents of the automatic retail device to a server at both the first and second times, and prompting the user to respond to an inquiry.

9 Claims, 7 Drawing Sheets

Related U.S. Application Data on Feb. 3, 2017, provisional application No. 62/454,692, filed on Feb. 3, 2017, provisional application No. 62/454,696, filed on Feb. 3, 2017, provisional application No. 62/433,464, filed on Dec. 13, 2016.

(51) Int. Cl.

| | | |
|---|---|---|
| *G06Q 10/08* | (2012.01) | |
| *G06Q 20/18* | (2012.01) | |
| *G06Q 20/40* | (2012.01) | |
| *G06Q 30/06* | (2012.01) | |
| *G07F 11/62* | (2006.01) | |

(52) U.S. Cl.
CPC ....... *G06Q 20/202* (2013.01); *G06Q 20/4014* (2013.01); *G06Q 30/0633* (2013.01); *G06Q 30/0639* (2013.01); *G07F 11/62* (2013.01)

(58) Field of Classification Search
CPC ...... G07F 11/42; G07F 9/026; G07F 17/0092; G07F 9/002; G07F 9/006; G07F 11/165; G07F 9/02; G07F 9/023; G16H 20/10; G16H 20/13; G16H 40/67
See application file for complete search history.

(56) References Cited

U.S. PATENT DOCUMENTS

| | | | | |
|---|---|---|---|---|
| 9,224,137 | B1* | 12/2015 | Tomasi | G07F 17/16 |
| 9,898,884 | B1* | 2/2018 | Arora | G07F 9/002 |
| 10,242,394 | B2* | 3/2019 | Dabiri | G07F 11/00 |
| 2001/0025883 | A1 | 10/2001 | Ichihara et al. | |
| 2002/0038167 | A1 | 3/2002 | Chirnomas | |
| 2002/0077724 | A1* | 6/2002 | Paulucci | G07F 7/00 700/231 |
| 2002/0087413 | A1 | 7/2002 | Mahaffy et al. | |
| 2004/0186620 | A1* | 9/2004 | Chirnomas | G07F 11/10 700/231 |
| 2005/0171854 | A1 | 8/2005 | Lyon | |
| 2005/0285716 | A1* | 12/2005 | Denison | G07C 9/00571 340/5.2 |
| 2006/0015435 | A1 | 1/2006 | Nathanson | |
| 2007/0050271 | A1 | 3/2007 | Ufford et al. | |
| 2007/0235465 | A1* | 10/2007 | Walker | G07F 9/026 221/9 |
| 2008/0103939 | A1 | 5/2008 | Gibb | |
| 2009/0119168 | A1 | 5/2009 | Otto et al. | |
| 2010/0057871 | A1* | 3/2010 | Kaplan | G07F 11/54 709/206 |
| 2011/0313775 | A1 | 12/2011 | Laligand et al. | |
| 2012/0004769 | A1* | 1/2012 | Hallenbeck | G07F 11/62 700/232 |
| 2012/0200385 | A1 | 8/2012 | Savage et al. | |
| 2013/0231776 | A1* | 9/2013 | Kuehnrich | G06Q 10/087 700/241 |
| 2014/0297487 | A1* | 10/2014 | Bashkin | A47B 96/02 705/28 |
| 2014/0316916 | A1* | 10/2014 | Hay | A47F 9/048 705/17 |
| 2015/0105901 | A1* | 4/2015 | Joshi | G06Q 20/327 700/232 |
| 2015/0254760 | A1 | 9/2015 | Pepper | |
| 2015/0287123 | A1* | 10/2015 | Holman | G07F 11/70 705/26.7 |
| 2015/0310411 | A1 | 10/2015 | Lindfeldt | |
| 2015/0317586 | A1 | 11/2015 | Kassman | |
| 2016/0098831 | A1* | 4/2016 | Glickman | G06T 7/0008 705/28 |
| 2016/0216106 | A1 | 7/2016 | Motoyama | |
| 2016/0379287 | A1* | 12/2016 | Dabiri | G06Q 40/02 705/26.43 |
| 2017/0053650 | A1* | 2/2017 | Ogawa | G10L 15/063 |
| 2017/0255896 | A1 | 9/2017 | Dyke | |
| 2019/0251776 | A1* | 8/2019 | Adelberg | G06Q 10/087 |

OTHER PUBLICATIONS

PCT Search Report and Written Opinion issued in PCT Application No. PCT/US18/16619 dated Apr. 23, 2018, 7 pages.

Non-Final Rejection issued in U.S. Appl. No. 16/483,358 dated Jan. 26, 2021.

Summons to attend oral proceedings pursuant to Rule 115(1) EPC issued in European Patent Application No. 17881917.3 dated Feb. 2, 2021.

U.S. Non-Final Office Action issued in U.S. Appl. No. 16/483,361 dated Feb. 19, 2021, 29 pages.

* cited by examiner

METHODS AND UTILITIES FOR CONSUMER INTERACTION WITH A SELF SERVICE SYSTEM

CROSS-REFERENCE TO RELATED APPLICATIONS

The present disclosure claims the benefit of and priority to U.S. Provisional Patent Application No. 62/433,464, filed Dec. 13, 2016; U.S. Provisional Patent Application No. 62/454,551, filed Feb. 3, 2017; U.S. Provisional Patent Application No. 62/454,687, filed Feb. 3, 2017; U.S. Provisional Patent Application No. 62/454,692, filed Feb. 3, 2017; and U.S. Provisional Patent Application No. 62/454,696, filed Feb. 3, 2017, the entire contents of each of which are incorporated herein by reference.

BACKGROUND

1. Technical Filed

The present disclosure is directed to methods and systems enabling consumer interaction with self-service systems. Specifically, the present disclosure is directed to systems and methods enabling interaction with vending and automatic retail devices.

2. Description of Related Art

Prior automatic retail devices and networked vending systems have been described in the following commonly-owned references: U.S. Pat. No. 8,191,779, entitled WIRELESS MANAGEMENT OF REMOTE VENDING MACHINES; U.S. Pat. No. 8,998,082, entitled MULTIMEDIA SYSTEM AND METHODS FOR CONTROLLING VENDING MACHINES; U.S. Patent Application Publication No. 2015/0279147, entitled, SYSTEMS AND METHODS FOR AUTOMATED DISPENSING SYSTEMS IN RETAIL LOCATIONS, filed Mar. 31, 2015; and U.S. Patent Application Publication No. 2017/0148005, entitled INTEGRATED AUTOMATIC RETAIL SYSTEM AND MFTHOD, filed Nov. 20, 2015. Each of these patents and U.S. Publications are incorporated herein by reference.

While each of these references address certain issues of the remote vending and automatic retail device industry, improvements are always desired.

SUMMARY

The present disclosure is directed to a method of interacting with an automatic retail device, including receiving user identification information at the automatic retail device, and receiving confirmation of the identity of the user from a source external to the automatic retail device. The method further involves determining the contents of the automatic retail device at a first time, determining the contents of the automatic retail device at a second time, transmitting data regarding the determined contents of the automatic retail device to a server at both the first and second times, and prompting the user to respond verbally to an audible inquiry.

In accordance with further aspects of the disclosure, the prompt is from an artificial intelligence associated with the automatic retail device. The user's response to the prompt may be converted to a text file and transmitted to a server for resolution. The method may also include receiving a response from the server and converting the response to an audible signal for delivery to the user. The response may include an incentive for the user to engage in a specified activity. The response may be associated with a media presentation that is presented to the user on a display. The media presentation may assist in responding to the inquiry from the user. The response may include instructions for the automatic retail device to illuminate one or more bins to alert the user to the location of an item therein. Further, the response may identify the location of a product at a second automatic retail device.

In accordance with the present disclosure the first time may be prior to unlocking a door of the automatic retail device and a second time period is after re-locking of the door. Further, the differences in weight and the locations of the differences in weight indicate which products were removed from the automatic retail device. The identity of the products are stored on the server and used to resolve payment from the user.

In accordance with a further aspect of the disclosure upon receiving confirmation of the identity of the user, the AI greets the user by name. The greeting may include the prompt which requests the user identify desired products.

DETAILED DESCRIPTION

The present disclosure is directed to systems and methods for improved and streamlined interaction with vending and automatic retail machines. As has been appreciated in the incorporated references, inventory control and sales communications are paramount issues in the vending industry. While vending machines are a unique way of offering unsupervised sales of products, there remain four issues that plague all such systems. The first is the loss of goods being improperly accounted for by those who perform the inventory stocking of the vending machines. The second is that the vending machine must be specifically tailored to the products being vended. Third, the user or purchaser of products within the vending machine must both know what products are desired and have appropriate money for procuring the products. Finally, the seller, manufacturer, or vendor are unable to collect data regarding the products and the individuals purchasing the products, thus potentially losing opportunities to increase sales or to provide products that are more desirable to the purchasers. The present disclosure provides systems and methods addressing all of these issues.

Figure 1:
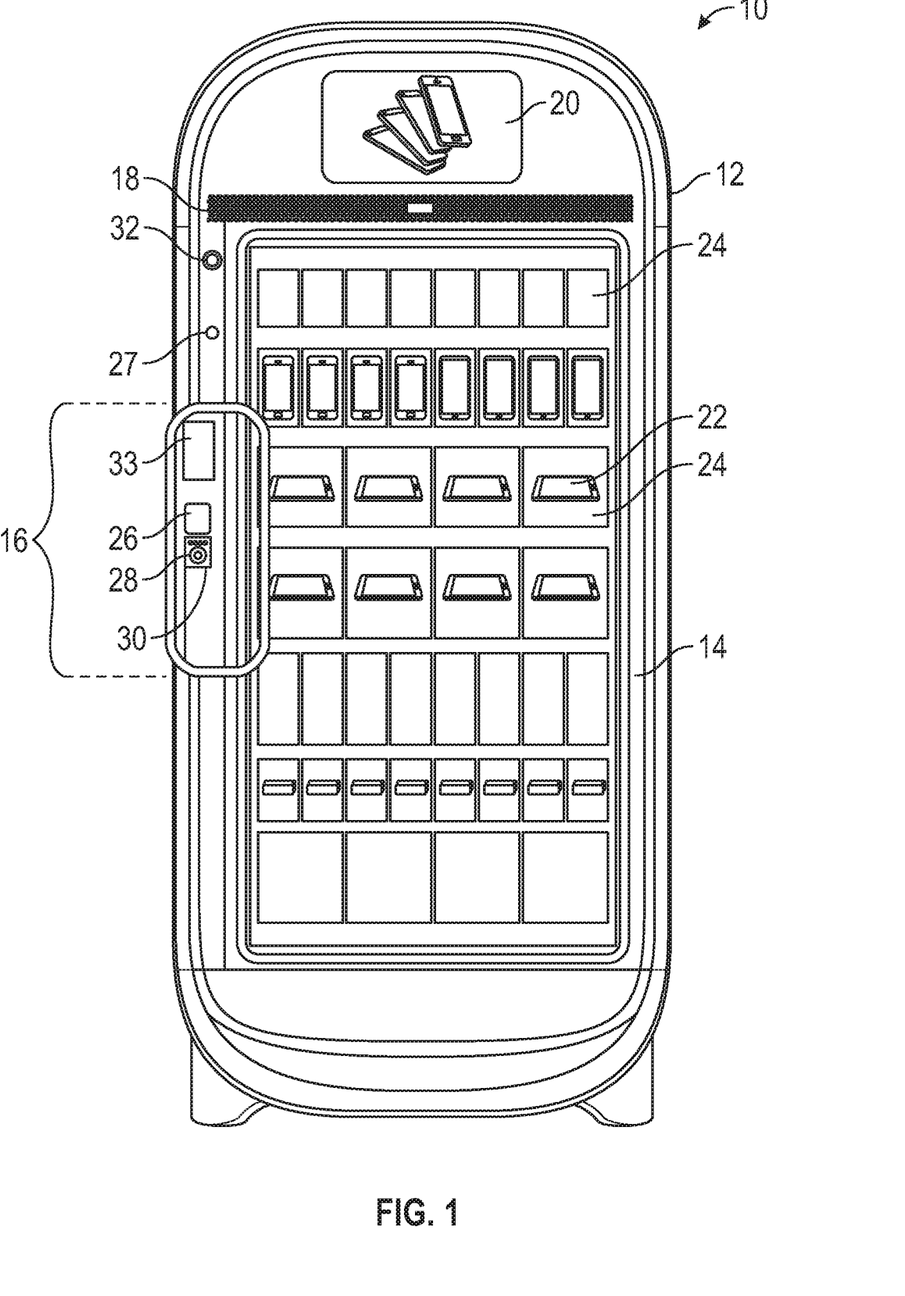
FIG. 1 is a front view of an automatic retail device in accordance with the present disclosure.
Figure 1A:
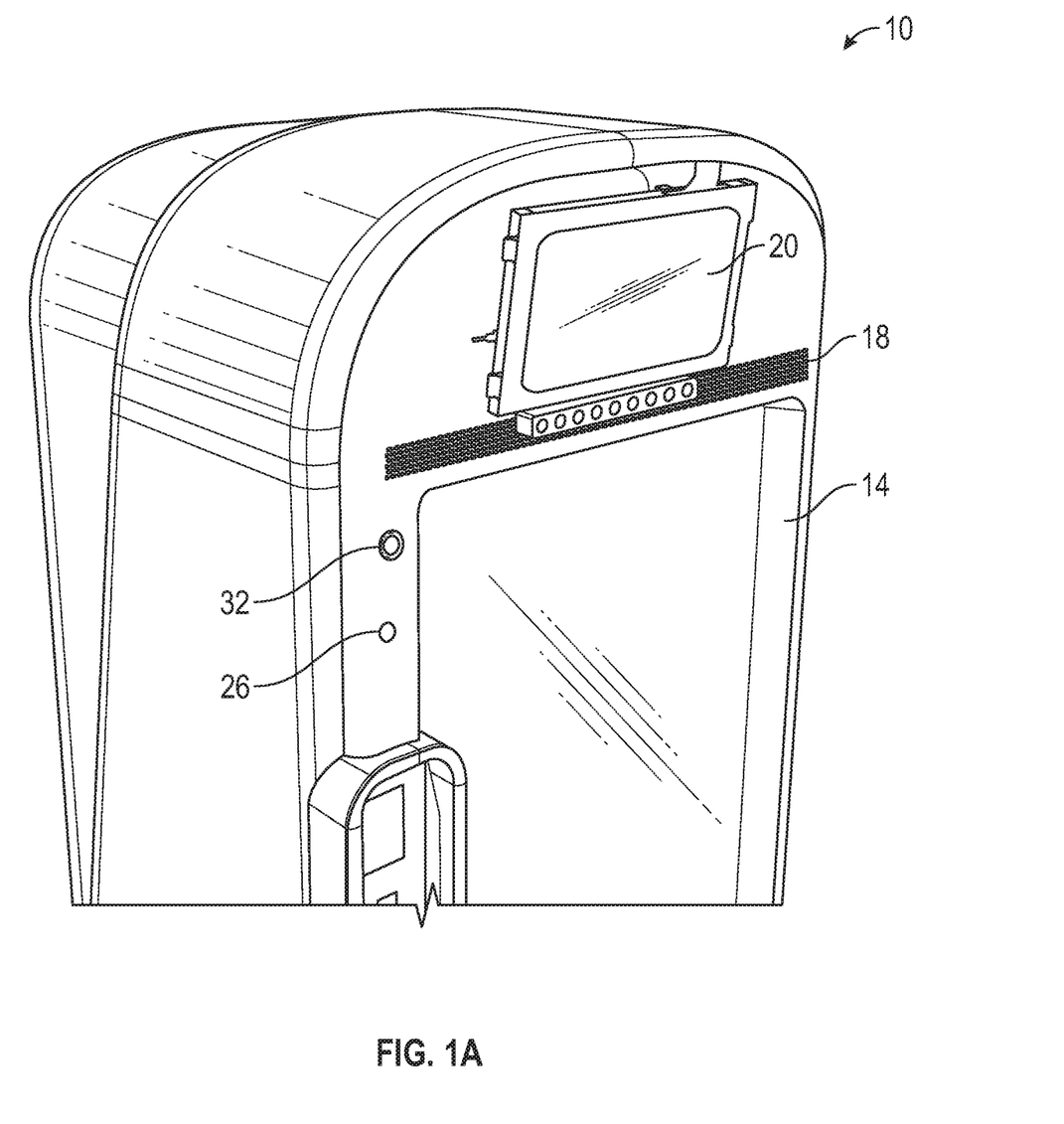
FIG. 1A is a front perspective view of a portion of the automatic retail device of FIG. 1.

FIG. 1 depicts an automatic retail device 10 in accordance with the present disclosure. The automatic retail device 10 includes an enclosure 12 having a door 14. The door 14 employs a locking mechanism 16 to limit access to the automatic retail device 10. Soundbar 18 outputs audible information to a user at the automatic retail device 10. The soundbar 18 also incorporates a microphone which receives verbal communication from a user, as will be described in greater detail below. Though the soundbar 18 is described as including both speakers for outputting sound and a microphone, these elements may be separately provided without departing from the scope of the present disclosure. A display 20 outputs visual information to a user at the automatic retail device 10. The door 14 preferably has a glass front 22 allowing a user to see all that is retained within the automatic retail device 10. In some embodiments, the glass front 22 may include image projection capabilities so that advertisements and other images may be presented on the glass. Typically, this is done in a way that renders the glass front 22 at least semi or partially opaque and can project any number of colors to present pleasing or relevant information to anyone who views the glass front 22. As an example advertisements of products within the device may be presented, or in instances where an automatic retail device 10 is at a particular location, for example a sporting event, a live broadcast or summary of the events transpiring while a user is making a purchase can be depicted.

In this embodiment, the glass front 22 reveals what appear to be shelves including a variety of bins 24. In fact, each bin 24 is individually mounted to a back wall of the automatic retail device 10, and a wide variety of different sized bins 24 can be interchangeably employed depending on the articles to be vended. For further details regarding the construction of the support for the bins 24 as well as the back wall of the automatic retail device 10, reference is made to U.S. Provisional Application No. 62/536,811, entitled "Cantilevered Weight Sensitive Shelf, Rail, and Mounting System," filed Jul. 25, 2017, the entire contents of which are incorporated herein by reference.

The locking mechanism 16 may include a variety of features that can be interchangeably or in combination used to permit or limit access to the interior of the automatic retail device 10. For example, a biometric identifier (e.g., thumbprint reader) 26 may be incorporated into the locking mechanism 16. Alternatively or additionally, the biometric reader 26 may be an iris scanner. Further, a near field communication (NFC) reader 28 may be incorporated into the locking mechanism 16, which is used to communicate with another NFC enabled device (e.g., most smartphones operating applications such as APPLE PAY® or ANDROID PAY®). Additionally or alternatively, the NFC reader 28 may be an RFID reader and may be employed to detect the presence of an RFID tag. Still further, a card reader 30 may be utilized and permit access to the automatic retail device 10 only after swiping or reading of the chip on a credit card. Still further, a facial recognition camera 32 may be employed to detect a user as they approach the automatic retail device 10. Finally, a key pad 33 (either physical or a touch screen) to enable the inputting of pin codes or promotion codes and the like may further be coupled to and/or incorporated in the locking mechanism 16, as will be described in greater detail below. The keypad or touchscreen 33 may also be used to enable responses by the user (e.g., selection of an option, presentation of branding associated with a product or service, or it may flash to alert the user of its location). Not shown in FIG. 1 are one or more further cameras located on the interior of the automatic retail device 10, these may be positioned on the interior of the door 14, or on certain bins 24 to enable filming/recording of user actions and user identification when retrieving items from the automatic retail device 10.

Any of these inputs from a user may be used to permit access to the goods and products kept within the automatic retail device 10. In order to access the automatic retail device 10, a user may set up an account through an application (not shown) that can be downloaded to the user's smartphone or accessed through a web-based system using a computer, tablet, or other web-enabled device. The user inputs their information, including a credit card number, debit card number or other payment information. During this process, the user may be requested to take a photo of themself, provide a thumb or finger print, submit a voice sample, or simply provide a pin number. Most smartphones include means for collecting images, finger or thumbprints, and voice samples, and can be configured to conduct an iris scan using the resident imaging capabilities. This information is collected and transmitted in encrypted form to servers that house the information for future use, as will be described in greater detail below.

Figure 2:
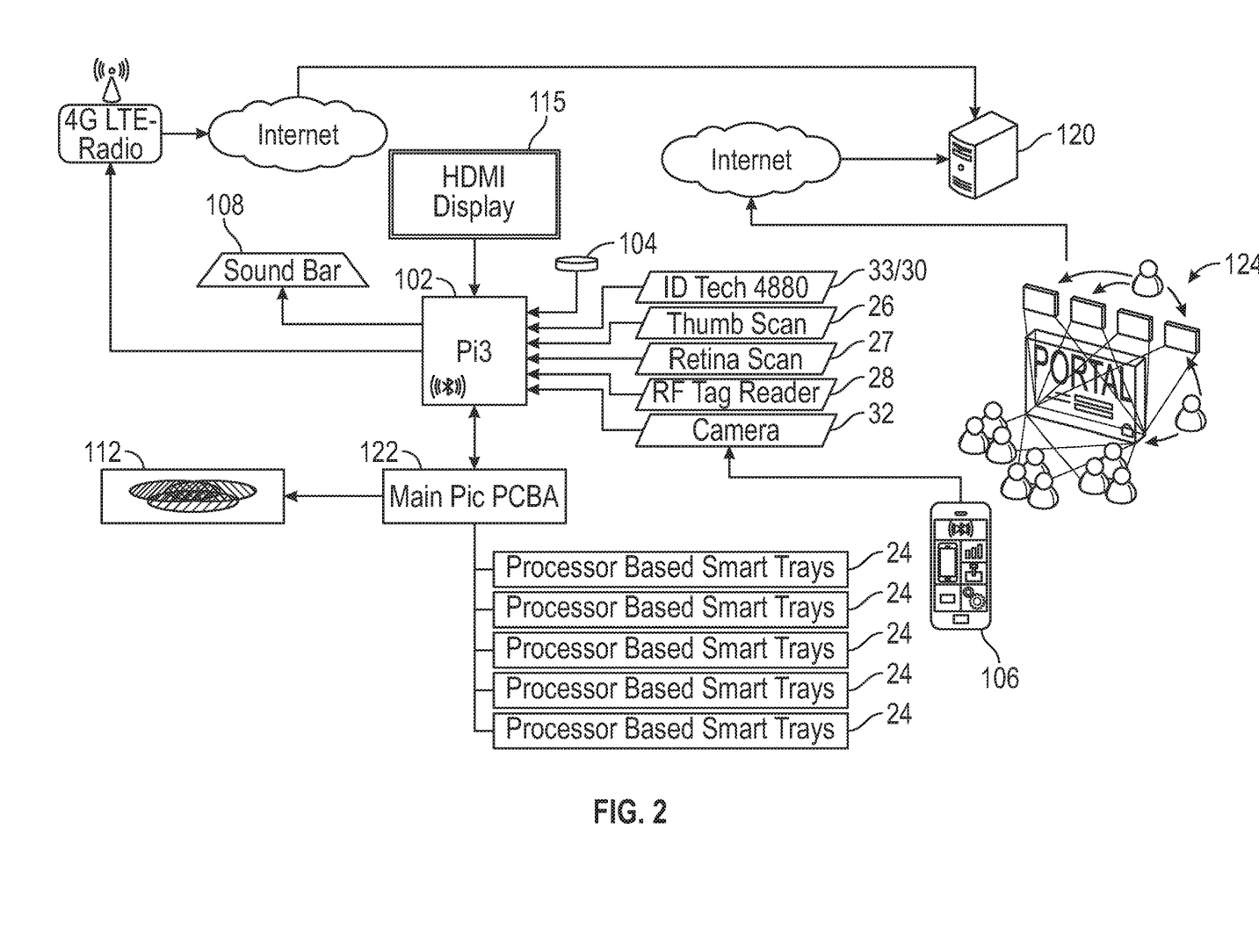
FIG. 2 is a system architecture diagram of an automatic retail system in accordance with the present disclosure.

The automatic retail device 10 may have an architecture as depicted in FIG. 2. The automatic retail device 10 includes a microcontroller 102 which receives input from a variety of the components described above, including a microphone 104, a card reader/touchscreen 30/33, a fingerprint scanner 26, a retina scanner 27, and RFID tag reader (e.g., a NFC device) 28, and/or a camera 32. A display screen 20 also receives input from the microcontroller 102. Still further, the microcontroller 102 may be enabled to receive communications directly from a smartphone 106 via, for example, BLUETOOTH® and other wireless communication protocols. The microcontroller 102 also provides outputs to the speakers 108, and to a wireless internet connection 110, such as 4G LTE or other cellular or wireless communications systems, to enable internet connectivity. The internet connectivity allows for communications over the internet for a variety of purposes, as described in greater detail below. The microcontroller 102 also controls the locking mechanism 16 of the automatic retail device 10.

The locking mechanism 15, and particularly the fingerprint scanner 26, NFC device 28, or card reader 33 can include a lighting mechanism whereby a light pipe or other light source projects backlighting onto a rear surface of these interfaces. This may be a Red, Green, Blue type backlighting arrangement. This backlighting allows the user to request indication of which interface is for which type of payment and have the Automatic retail device 10 light the appropriate one in response to the request.

The microcontroller 102 is primarily responsible for receiving inputs from a user and communicating with the system servers 120 to confirm the identity of the user and permit access to the automatic retail device 10. In connection with the confirmation of the identity of the user, a variety of protocols may be initiated. Upon receiving an input from a user to authorize access to the automatic retail device, the microcontroller 102 may signal the main controller 122 to survey the contents of the automatic retail device 10. This may be done by weighing each bin 24 of the automatic retail device 10. As noted above, these bins 24 can be installed in a variety of configurations to accommodate different items. Further, the main controller 122 and/or the microcontroller 102 may have access to a planogram outlining the contents of each bin 24 and the per-item weights of each item to be stocked in the automatic retail device 10. The planogram may be saved in memory associated with the main controller 122 and the microcontroller 102. As a result of this data, which is stored in a form accessible by the main controller 122 and the microcontroller 102, immediately before the unlocking of the door of the automatic retail device 10, a survey may be conducted to determine the contents of each individual bin 24 contained within the automatic retail device 10. While the contents of the survey of the automatic retail device 10 are being determined, the information provided by the user, e.g., the biometric data or RFID tag data or image, is transmitted to the servers 120 for confirmation of the user's identity. The servers 120 transmit a signal either confirming the user's identity and granting access or denying access to the automatic retail device. With the contents of the automatic retail device 10 confirmed, and the identity of the user confirmed, the microcontroller 102 can output a signal to the locking mechanism 16 to allow the door 14 to be opened. Upon opening of the door 14, the main controller may initiate certain lighting 112 to be undertaken. From this point forward the user may remove as many items as desired from the automatic retail device 10. Upon closure of the door 14 the locking mechanism 16 automatically engages locking the automatic retail device 10. The locking may be associated with a slight delay of 1-10 seconds to allow a user to change their mind and select a further item or return a selected item. Once the lock engages, the main controller 122 again conducts a weighing exercise to determine which bins 24 changed in weight and by how much. From this data, the main controller 122 in combination with the microcontroller 102 can determine which items were removed and how many of each. This data is then transmitted by the wireless internet connection 110 to the servers 120 via the internet and posted to the user's account. Because the purchase determination is based on the before and after weighing of the bins 24, the user is free to select an item, read its contents, consider other options, replace the initial item and not be charged for it unless is remains outside of the automatic retail device 10 upon closure and relocking of the door 14. In addition, if a user decides after locking that they actually did not want that product, they may again engage the automatic retail device 10, unlock the door 14 using the methods described above, and then return the item. If properly returned to the proper shelf, and the weight is confirmed by the automatic retail device 10, then the cost of the item may be removed from the user's account. If the weights do not match, or if the item is returned to the wrong location the automatic retail device 10 may alert the user to such an occurrence before locking the door 14 to allow the user to correct the error before locking and avoid unnecessary charges.

As described briefly above, a user may create a user account using an application on their smartphone 106. Alternatively, the user may avail themselves of a client portal 124 via a web connected device and create an account granting the user access to the automatic retail device 10. The user interface allows the user to enter the necessary identifying information and provide the biometric samples (e.g., iris scan, photo, voice sample, thump print, etc.). In addition, the client portal 124 allows the user to check their account balances, alter payment arrangements, and challenge charges to their account.

As an alternative to or in addition to the app or the client portal 124, the user may go through an account set-up process at the automatic retail device 10. The interactions with the automatic retail device 10 may be supported by an artificial intelligence (AI) that is either resident on the automatic retail device 10 or in close communication via the internet connection 110 (e.g., on a server 120). An AI in its simplest form is a combination of computer programs that can receive different inputs and respond audibly, physically, or visually using the soundbar 18, the display 20, the lighting 112 and other features of the automatic retail device 10. Often, the AI is primarily a translator from speech to text to data enabling the microcontroller 102 to analyze the data and formulate a response or to communicate further to the server 120 via the internet connection 110 to resolve the communication, receive a return of data from the server 120 and again translate that to a form the user can understand. That translation may be audible using the soundbar 18, it may be visual using the display 20, it may include lighting 112, and other forms of communication.

In the example of setting up an account at the automatic retail device 10, after inserting a credit card, the AI associated with the automatic retail device 10 walks the user through a series of questions and queries to set up the account. For example, having read the information on the credit card, the AI using the soundbar 18 may communicate directly with the user asking if they would like to set up an account. When the user says yes, the AI may ask that the user confirm their name, and provide some additional information to corroborate their identity. Once corroborated, the AI may request the user place their finger or eye on or near the biometric reader. The data related to user's biometrics are stored and will be forwarded to the servers 120 and databases that house the information of all the users. The AI may also take an image of the user and associate that image with the account. Still further, a voice sample may be recovered for comparison purposes in future transactions. This may take the form of a request for verbal confirmation that the user wishes to agree to the terms of use of the automatic retail device 10. Once all the data is collected, anything removed by that user from the automatic retail device 10 will be charged to the user's credit card or otherwise reconciled as set out in the agreement with the automatic retail device 10 system. In one embodiment, none of the data regarding the user is saved locally on the automatic retail device 10, but rather is uploaded in an encrypted form to the servers 120 for access at later time. In effect, this action at the automatic retail device 10 is identical to the outcome achieved using either an app. on a smartphone 117 to set up an account, or using the client portal 124.

Figure 3:
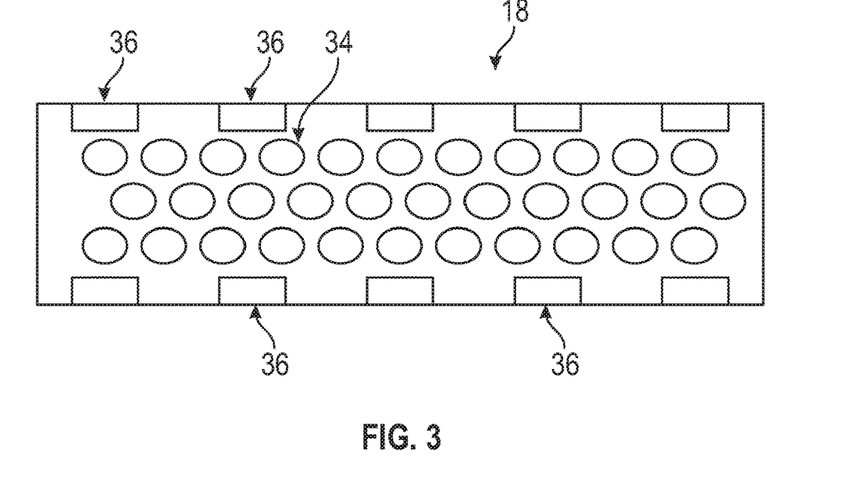
FIG. 3 is a schematic diagram of a soundbar in accordance with the present disclosure.
Figure 4:
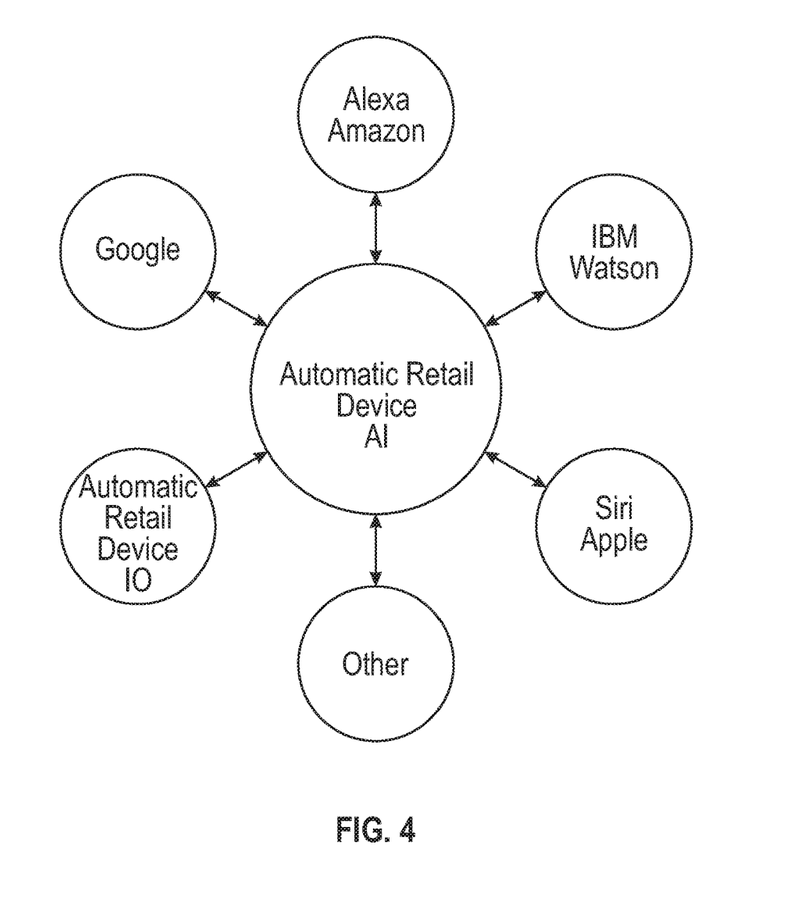
FIG. 4 is a schematic diagram of an AI resident on an automatic retail device of the present disclosure and its network to other AI devices and systems in accordance with the present disclosure.

To assist in protecting the user's privacy, the soundbar 18 may include directional ultrasound speakers as shown in FIGS. 3 and 4. The use of such a configuration is particularly important were limiting the propagation of the sound is desired. By using the ultrasound speakers, a very narrow beam of sound can be directed at the person using the system and thereby not annoy others who might be working the same space, and limit the carry of any information about the user, or even the questions being asked, to any persons in proximity to the automatic retail device 10. In accordance with one aspect of the disclosure, the directional soundbar 18 is mounted immediately under the display 20 depicted in FIG. 1 at the top of the automatic retail device 10, and angled down towards the user. In this way, clear communications can be had without having the sound propagate widely in any space.

In a further embodiment, the soundbar 18 can have two modes of operation, a 3D or broadcast mode, and a private mode. Under such a scenario, the soundbar 18 can alter its projection of sound from, for example, broadcasting of music to the general area, to a private conversation with just a user that presents themselves at the automatic retail device 10.

FIG. 3 depicts an arrangement of soundbar 18 formed of a plurality of directional ultrasound speakers 34. Additionally, the arrangement includes a microelectromechanical (MEMS) microphone array 36. In the embodiment depicted in FIG. 3, 6 MEMS microphones 36 form the array 34. Through the use of filtering (e.g., bandwidth filtering) the MEMS microphone array 36 can focus very closely on the range of sound at which most people speak (e.g., using bandpass filtering techniques) to remove background noise. As will be appreciated, this may be tuned specifically for the predominant languages of a region where the automatic retail device 10 is to be deployed, or other factors such as altitude and temperature that can affect the propagation of sound. More importantly, most if not all background noise is eliminated leaving just the speech from the user. Through the use of high quality sound propagation and reception equipment, clear communications with a user are enabled. As noted elsewhere in this disclosure, the user's voice sample can be compared at any time during a transaction to confirm the identity of the speaker, and in some instances determine whether they are under duress (e.g., if being forced to make a purchase of a high dollar item) and alert proper authorities or undertake additional actions such as additional video of imaging of the user and others in the vicinity.

Clarity of speech is very important for enabling a two-way AI communication for the user. In accordance with one aspect of the disclosure a recording of a user's speech is made, and then this is converted to text. This conversion to text is a common methodology for most AI systems (e.g., GOOGLE HOME®, AMAZON ECHO®, APPLE SIRI®, etc.). Once converted to text, the form in which most data inquiries are made to computing systems (e.g., through a search engine or the like), the text (or at least data representing the text) is transmitted via data lines (e.g., wirelessly) to an internet server 120 associated with the automatic retail device 10 for resolution. A resolution to the inquiry is then returned to the automatic retail device 10, and is read out to the user through the soundbar 18. Note, the resolution may or may not be in a text format. Either way, once annunciated through the soundbar 18 of the automatic retail device 10, the user perceives the AI being physically present within the automatic retail device 10, even if all that is physically present are the data conversion components (e.g., speech to text to data, and data to speech). As will be appreciated, the rationale for the conversion to text is the decrease in data size for transmission (.txt files are smaller than .wav files) and thus results in an increased speed of communication.

In a further embodiment of the present disclosure, the AI of the automatic retail device 10 can provide an interconnect to either actual or simulated AIs or to other product fulfillment or information sources. In one example, if the user has linked their AMAZON® account to the automatic retail device 10, either via the app or the client portal 124, the AI could ask the user upon purchase of a new razor with just a single replacement blade in the packaging "do you want me to have ALEXA® send additional blades to your house?" If the purchaser agrees, the user's own AMAZON® account is accessed by the system and the order placed. Alternatively, if they do not have their AMAZON® account linked, the system could still ask about ordering replacement blades, but instead of using the purchaser's account, the AI could order the blades on behalf of the purchaser, charge the user, and resolve payment with AMAZON® through the AI's own account. Similar and additional functionality can be had via any of the currently available AI's including IBM WATSON®, APPLE SIRI®, GOOGLE®, etc. FIG. 4 is a depiction of the location of the automatic retail device AI 100 in relation to its AI partners with whom the AI can conduct business on behalf of the purchaser, as well as the location of the automatic retail device 10 IO.

Another feature of the automatic retail device 10 is the RFID reader 28. While typically not practical for all items, for high dollar items in excess of $50, manufacturers are willing to apply the RFID tags to the product. In this way, in addition to the weight sensitivity, and the access control, and the use of one or more cameras, a further tracking of specific types of products can be undertaken to clearly identify the purchaser should there ever be a dispute as to who took the item from the automatic retail device 10.

Indeed, the high dollar item is one instance where greater security can be ensured when RFID is used in combination with the AI. In one example, upon removal of the high cost item, the AI within the automatic retail device 10 can identify the item and engage in a conversation with the person who removed the item from the bin 24. For example, the AI may communicate with the user via the soundbar 18 that it is a high dollar item and ask them to audibly confirm that this is an item they intend to purchase, or ask if they are just browsing. The voice response may be used as a further proof of purchase by the user and that data may be stored in the server 120 should the user question any of the purchases listed in the user's account when accessing either the app. or the client portal 124.

But the usages of the AI go well beyond these features. With respect to purchasers, the AI may be used to greet the individual and, noting the purchasing routines of the individual, assist that individual in finding their preferred items. This action may be in connection with the camera 32 sensing the user approaching the automatic retail device 10, and using facial recognition software accessible to the AI to identify the approaching user as a verified user, thus unlocking the door 14. Further, with the AI having identified the user and granted access, the AI might say to the user "Hello Steve, looking for your usual chips and a soda?" Upon receiving an audible "yes" response, the AI could illuminate the bins 24 which include the products that Steve is looking for by switching on various lighting 112. Upon receiving a "no" response the AI might make a suggestion based on past experience or simply ask a follow-up question such as "well, what are you in the mood for?" With the answer to this follow-up question, a further recommendation may be made. Alternatively, the user might respond to the initial inquiry by stating "no, I'd like some chocolate." Upon receiving this response, the AI might respond by indicating the types of chocolate available, and illuminating the bins 24 in which each item can be found. In another instance the AI may incorporate an incentive in the response (e.g., 25% off) if one particular recommendation of product is selected by the user. This incentive may be audibly presented, visually presented or a combination of both. Alternatively, the incentive may be based on downloading either the automatic retail device 10 application, or another application for a third party service or product. Other options to receive an incentive include performing a survey, identifying a preference of products or a rationale for preference, or other marketing and product placement inquiries.

Figure 5:
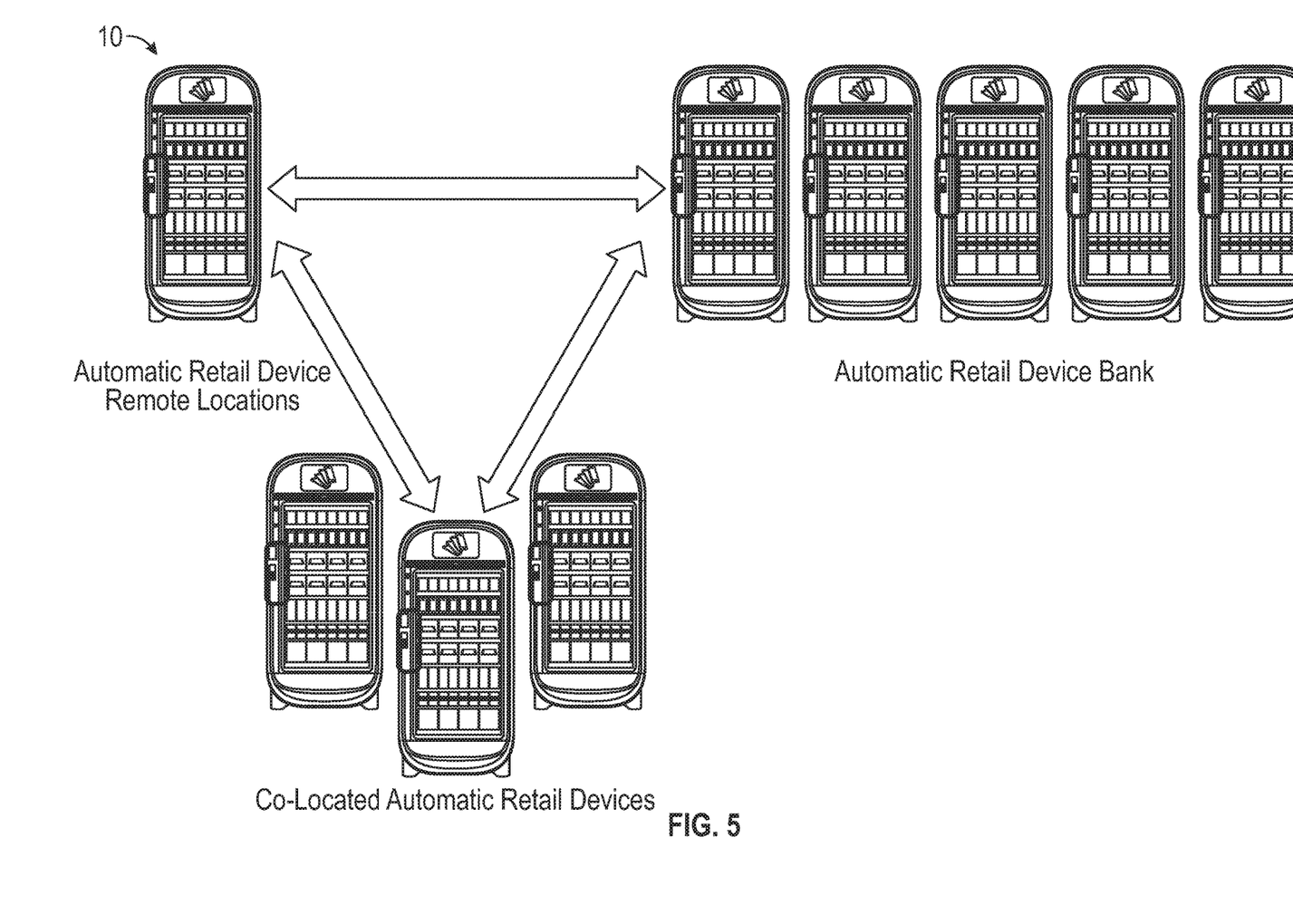
FIG. 5 is a diagram of a network of automatic retail devices in accordance with the present disclosure.

One feature of the AI better shown with reference to FIG. 5 is that in view of the networked aspects of the automatic retail devices 10, if one device does not contain the product that Steve is looking for, Steve may be directed to another machine in proximity to the one where he is located. Thus, localized inventory control can be undertaken and customer's needs satisfied even when the automatic retail device 10 they initially accessed does not have the product they are looking for. As shown in FIG. 5, the automatic retail device 10 may be deployed as a bank of devices, several located in proximity to one another (e.g., in different parts of the building) or as standalone units.

The AI can also be very useful for performing diagnostic functions. That is, during initial set-up or in the course of addressing a fault, the AI can provide audible instructions to enable a technician to easily and quickly diagnose and fix the problems. These instructions may be provided either alone or in addition to an app. resident on the user's smartphone or other dedicated device.

Still further, in the area of merchandise restocking, when the stocker of products arrives at the automatic retail device 10, they can be provided both a planogram of the automatic retail device 10, as well as a detailed required inventory for the stocker to place in the appropriate bins 24. In some instances this might even be provided in an efficient order of placing the products. During the stocking process, the AI can be monitoring each placement of product and confirming that each item is correct based on its weight and by the capture of images of the product as it is being placed. This can be based, for example, on the expected change in weight from the addition of a product as compared to the actual added weight, and when there is a discrepancy, the stocker can be alerted audibly by the AI. Sometimes there is a miscount, in other instances one of the packages (e.g., bag of chips) may have been improperly filled by the supplier. To avoid a purchaser from receiving less than what they were expecting, the stocker can be alerted by the AI and replace the item. Further, the AI can illuminate each shelf as it needs to be filled so that, again, efficiency in stocking can be accomplished.

As noted above, the stocker may have an app on their smartphone or other dedicated electronic device which can be used to place the automatic retail device 10 in a non-sales mode or a diagnostic/stocking mode. In instances of a new installation, this mode may also include a workflow for ensuring that each of the weight sensitive shelves is accurately measuring weights and can be relied on in service. This app. may include a planogram that graphically depicts where items are to be placed. The planogram may be displayed on a user interface for the stocker to view. Further, this mode may prevent the lock from engaging upon release of the door 14. Upon entering such a mode, the door 14 will remain unlocked allowing for the stocking of the shelves until either a certain time has expired with no further opening of the door 14, the stocker signals that they are done on their app. or the AI and the stocker engage in a conversation indicating that the session is closed.

In addition to following a planogram, the AI itself may engage in conversation with the stocker regarding the products required to be restocked. This may be provided to the stocker in a particular order, and may identify quantities that are required to completely resupply. In instances where less than the desired amount is supplied, the AI may record an exchange with the stocker regarding the shortfall. This information may be used in combination with a communication to the servers 120. In this way, accurate records of the products stocked in each and every automatic retail device 10 can be maintained. Further, the cause of the shortfall can be ascertained, and, where appropriate, the stocker may be confronted by management for theft of items, the supplier may be notified that they are delivering less than the specified amount of product, or changes in the dimensions or specifications of a supplied product can be updated for future use by the automatic retail device 10 and the system as a whole. If, for example, a product was damaged and could not be stocked, the rationale might be noted either verbally or in the app. to account for the product and further confirm that it was not simply pilfered by the stocker.

Regardless of how stocked, upon completion of the session, the AI can confirm that all the required goods were accounted for and notify the inventory management system on the servers 120 of the updates in inventory and any discrepancies from expectations.

Figure 6:
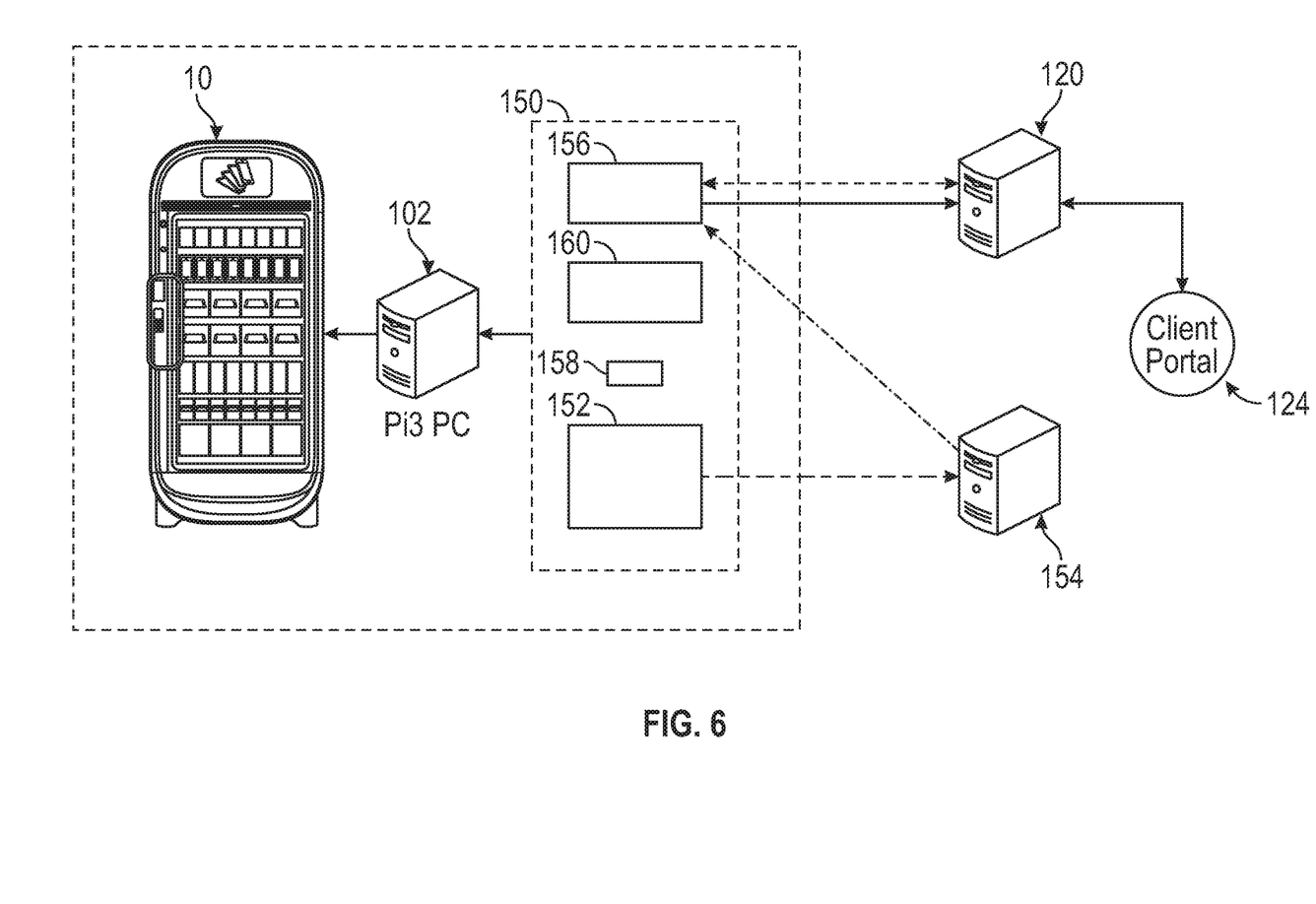
FIG. 6 is a simplified network diagram for an automatic retail device in accordance with the present disclosure.

FIG. 6 is a simplified communications architecture for the automatic retail device 10. The automatic retail device 10 includes a microcontroller 102 which executes a variety of software applications, programs, and routines stored in memory 150. This software includes an access control component 152, which will receive the identifying information from e.g., a thumb print, and communicate with a secure server 154 that can verify that the thumb print is associated with a user having an account in good standing with the automatic retail device 10 system. Upon receipt of this information, the automatic retail device may execute control software 156 to unlock the door 14. While waiting for the resolution from the secure server 154, the control software 156 may execute the inventory process described above and transmit data regarding this survey to inventory management applications running on servers 120. These additional servers 120 may also store and enable access to the client portal 124. Once access is granted by the automatic retail device 10 following receipt of confirmation by the secure server 154, the automatic retail device 10 continuously surveys removal of items. Upon closure and locking of the automatic retail device 10, a signal is sent to the server 120 identifying the goods removed. A program on the server 120 receives this signal and associates the goods removed with the user's account. There may additionally be direct communication between the secure server 154 and the servers 120 which may allow the programs on the two respective servers to resolve billing concerns and to effectuate transfer of funds between the entities operating the separate servers e.g., credit card and financial institutions and the retailer operating the automatic retail device 10.

In one embodiment, no user information is ever stored locally on the automatic retail device 10, and upon receipt of such information from a user, the data is transmitted in encrypted form to the secure servers 154 to enable access and provide an encrypted identifier to the control software 156 that can be transmitted to the servers 120 in conjunction with a list of goods removed from the automatic retail device 10 for associating with a specific user's account.

Additionally, the AI functions described in detail may be enabled in part by the communication capabilities between the AI module 158 and the server 120. In one embodiment, certain communication protocols are stored locally in the AI module 158 and executed upon receiving certain prompts from a user. For example, these may include greetings, standard questions, and basic responses to inquiries from a user. For more detailed or complex questions, the AI can utilize the interface with the internet and the servers 120 to provide appropriate responses.

A media manager 160 prompts the display of media to a user on, for example, the display 20 and broadcast of audio to a user via the soundbar 18. In some instances, these media may also be AI interactive such that the presented media is changed based on responses to inquiries or prompts from the AI to the user.

Figure 7:
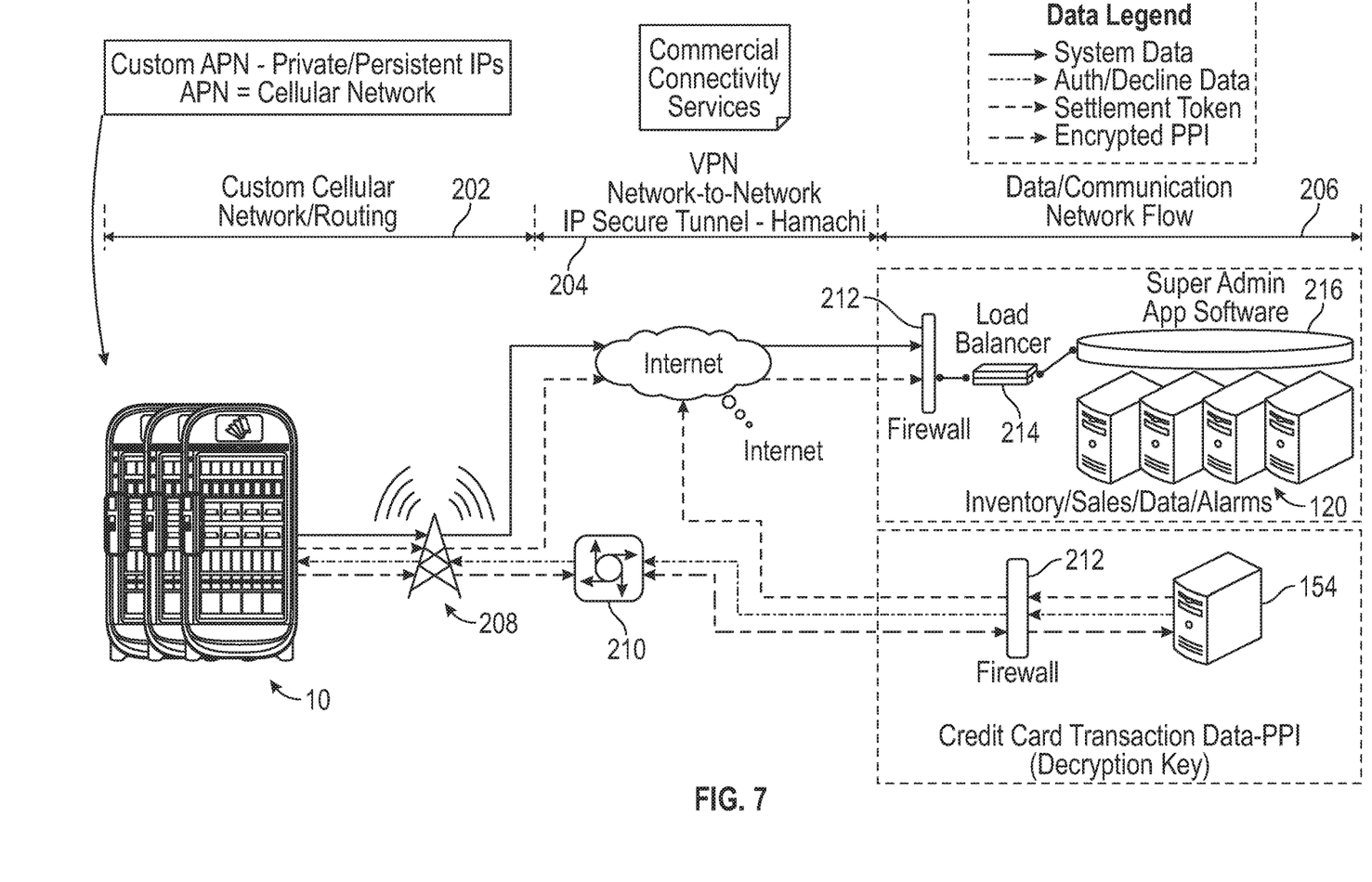
FIG. 7 is a further network diagram for an automatic retail device in accordance with the present disclosure.

FIG. 7 is a more detailed diagram of a communications network 200 of the present disclosure composed of three primary components. A cellular network component 202, a VPN component 204, and a data/communication network component 206. As will be appreciated, communication between the various network components is facilitated by wireless communications, particularly through standard cellular networks (e.g., 3G, 4G, LTE, 5G, etc.). The automatic retail device 10 includes a wireless internet connection 110 that enables communication to one or more cellular towers 208. As will be appreciated, the cellular towers 208 can communicate via the internet to servers 120. The cellular towers 208 may also communicate to one or more gateway devices 210. These gateway devices 210 are access points connecting, for example, a third party intranet with the automatic retail device 10. The gateway device 210 limits exposure of the intranet to outside communications and provides a single address through which all communications with devices on the intranet must pass. The gateway devices 210 and the intranet help form two parallel paths of the VPN component 204 of the network 200. Both communications from the gateway device 210 and the internet must pass through firewalls 212 in order to access the servers 120 or the secure servers 154. As depicted, the servers 120 are connected to the firewall via a load balancer 214 to ensure that communications do not overwhelm any single server 120. Each server 120 (either physical or virtual) may be dedicated to a single entity operating one or more automatic retail devices 10. In this way one entity, for example a beverage company, may purchase many automatic retail devices 10, and have all their communications with them be enabled through an operator's portal (not shown) to the server to perform tasks such as inventory management, tracking of sales, reviewing purchase data, responding to alarms, managing display content, etc.

Also shown in FIG. 7 is an admin software module 216 which enables the manufacturer of the automatic retail devices 10 to supervise certain actions. For example, associating such devices with a particular user (e.g., a beverage company) so that it is accessible via the operator's portal. Other functions that can be enabled here are diagnostic functions of the automatic retail device 10, many of which may be the result of software or communications issues. As a result, rather than sending a service technician to the automatic retail device 10, many issues can be resolved remotely from the admin software module 216.

An interaction with the automatic retail device 10 starts with a user approaching and providing identification data, for example a retina scan. This data is transmitted through the cellular towers 208 (in digitized form), to the gateway 210, and to the secure server 154 after passing through firewall 212. This data is encrypted at the automatic retail device 10 using, for example, Transport Layer Security (TLS), Secure Sockets Layer (SSL), Payment Card Industry Data Security Standard (PCI DDS), Payment Processing, Inc.'s, PPI PayMover Encrypted Swipe, or others. This encrypted and protected personal information (PPI) is analyzed by the secure server 154 to ensure that the user is a customer in good standing and that the personal information matches that stored on the server 154. Regardless of the outcome, an authentication/decline communication is directed back to the automatic retail device 10 via the gateway 210 and the cellular tower 208. If the secure sever 154 determines that the user is authorized the communication indicates this to the automatic retail device 10. Upon such receipt, the automatic retail device 10 unlocks the door 14.

Simultaneously, with the transmission to the secure server 154, the automatic retail device 10 communicates system data to the servers 120 via the cellular tower 208 and the internet. This data may include data such as inventory data prior to opening the door 14 as well as other relevant data.

The secure server 154 also issues a token that is directed to the server 120 via the internet. Upon closure of the door 14 and resolution of the items removed from the automatic retail device 10, the automatic retail device 10 also issues a token, associated with the purchase to the server 120 via the internet. The server uses these tokens along with other data supplied by the automatic retail device to identify the items purchased and the identity of the purchaser. This data is then stored in the databases associated with the server 120 and may be viewed by the user via a client portal 124, or reviewed by the operator using an operator portal. The tokens and the data supplied to the server 120 are used in conjunction with the secure servers 154 to resolve payment for the articles removed from the automatic retail device 10.

As noted above, the system data may include items such as questions directed at the AI that are beyond those stored locally, answers to AI directed questions, updated media, indications of which media to present for a particular user, alerts, alarms, diagnostic queries and answers, updated software, and other data that would be relevant to the networked automatic retail device 10 and the larger network system 200.

The invention claimed is:

1. A method of interacting with an automatic retail device, the method comprising:
receiving user identification information at a controller of the automatic retail device;
receiving, by the controller, confirmation of an identity of a user from a source external to the automatic retail device;
determining, by the controller, the contents of the automatic retail device at a first time;
determining, by the controller, the contents of the automatic retail device at a second time;
transmitting, by the controller, data regarding the determined contents of the automatic retail device to a server at both the first and second times;
receiving, by the controller, a resolution from the server;
converting, by the controller, the resolution to an audible signal for audible delivery to the user; and
prompting, by the controller, the user to verbally respond to an inquiry, the inquiry based on the resolution, wherein the inquiry prompt is calculated from artificial intelligence of the automatic retail device,
wherein the user's response to the prompt is converted from audio to a text file and transmitted to the server for further resolution by the controller,
wherein the first time is prior to unlocking a door of the automatic retail device and the second time is after re-locking of the door,
wherein the determining at the first time and the second time includes weighing, by the controller, a weight of bins of the automatic retail device,
wherein determined differences in the weights of the bins between the first time and the second time and locations of the differences in weight indicate which products were removed from the automatic retail device, and
wherein transmitting the data includes transmitting a signal to the server identifying the removed products, and the signal identifying the removed products is useable by the server to resolve payment from the user,
further comprising receiving, at the controller, a response from the server and converting the response to another audible signal for delivery to the user, and wherein the response further includes instructions for the controller to control the automatic retail device to illuminate one or more of the bins to alert the user to the location of an item therein, and in response to the controller receiving the response from the server, illuminating one or more of the bins that relate to the user's response to the prompt.

2. The method of claim 1, wherein the response includes an incentive for the user to engage in a specified activity.

3. The method of claim 1, wherein the response is associated with a media presentation that is presented to the user on a display.

4. The method of claim 3, wherein the media presentation assists in responding to the inquiry from the user.

5. The method of claim 1, wherein the response identifies a location of the product at a second automatic retail device.

6. The method of claim 1, wherein the response identifies a location of the product at an order fulfillment service and asks if the user would like to place an order for the product.

7. The method of claim 1, wherein an identity of products of the automatic retail device are stored on the server and used to resolve the payment from the user.

8. The method of claim 1, wherein, upon receiving confirmation of the identity of the user, the user is greeted by name through artificial intelligence.

9. The method of claim 8, wherein the greeting includes the prompt which requests the user identify desired products.

* * * * *